Sept. 9, 1924.
E. C. HEALD
1,507,602
READY REFERENCE TABULATING INDEX FOR FILES
Original Filed Dec. 15, 1919    2 Sheets-Sheet 1
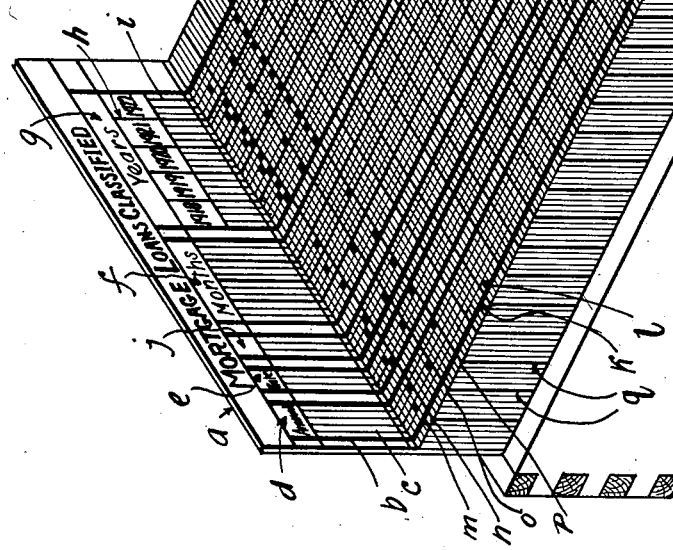
Inventor:
Ernest C. Heald.

Sept. 9, 1924.　　　　　　　　　　　　　　　　　1,507,602
E. C. HEALD
READY REFERENCE TABULATING INDEX FOR FILES
Original Filed Dec. 15, 1919　　2 Sheets-Sheet 2
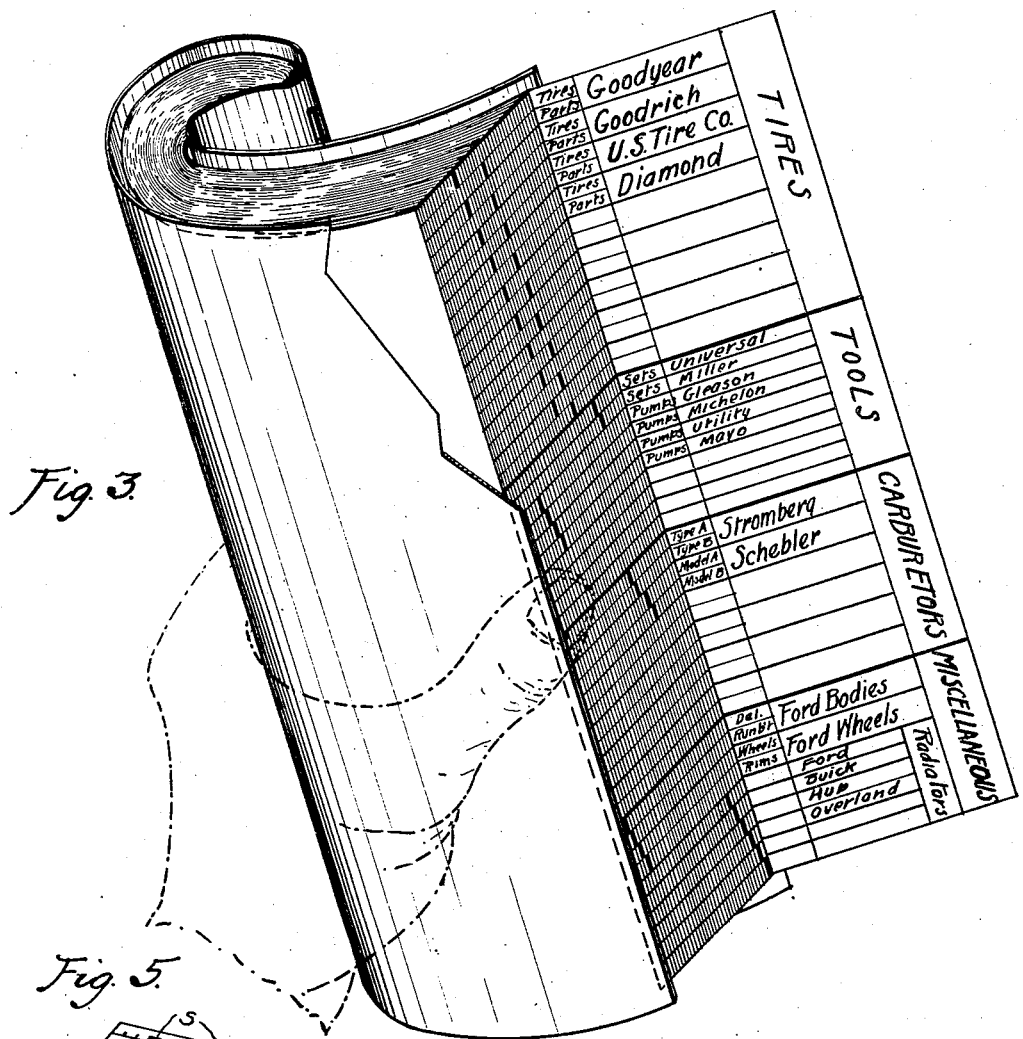
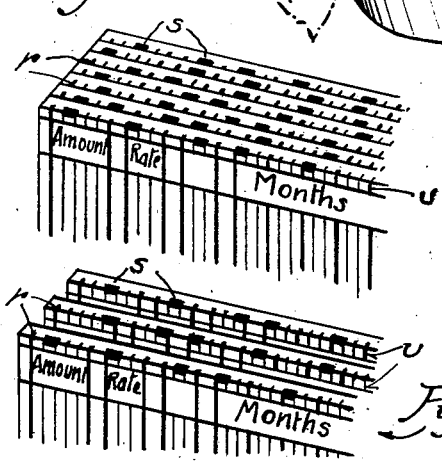
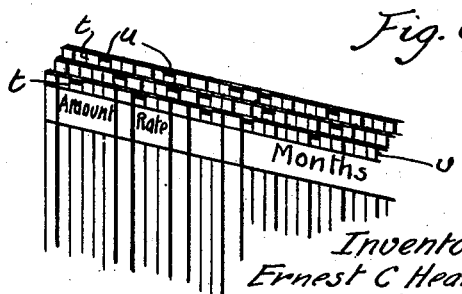
Inventor:
Ernest C. Heald
by 〽️ Atty.

UNITED STATES PATENT OFFICE.

ERNEST C. HEALD, OF PORTLAND, OREGON.

READY-REFERENCE TABULATING INDEX FOR FILES.

Application filed December 15, 1919, Serial No. 345,152. Renewed February 4, 1924.

*To all whom it may concern:*

Be it known that I, ERNEST C. HEALD, a citizen of the United States, and a resident of Portland, county of Multnomah, State of Oregon, have invented a new and useful Improvement in Ready-Reference Tabulating Indexes for Files, of which the following is a specification.

My invention relates to the indexing for ready reference of the records or data borne by the units of a file of cards or folders stacked edgewise in a drawer or container, or by a file of leaves massed in a book, or otherwise, where the subject matter of the file comprises a plurality of correlated items necessarily associated, and hence each file unit must bear all the correlated items in order to make the particular data borne by the file unit comprehensive.

The object of my invention is to indicate by symbolic marks, placed on the edges of the file-units lying in the exposed face of the file, the data borne by the latter as a whole, and also the details which each file-unit bears or contains.

I attain my object by placing said symbolic marks so as to lie in columns extending crosswise of the file, such columns denoting the segregated, specific items of correlated data of the subject matter. Hence the marks on the file indicate symbolically the entire contents of the file, and the marks on each unit gives symbolically the details of the contents of each file-unit.

In order to facilitate the understanding of the principles of my invention, I will describe the same in the first place as applied to a card-file system designed for the needs of a money loaning business, for keeping a record of various loans.

Let it be assumed for example that a card file shall be arranged to keep a record of the sums loaned, to give the date when each loan is repayable, also the interest rate, and how the interest is payable, that is, whether annually, semi-annually or quarterly; and shall specifically give the months and years in which the interest is payable; such information obviously also giving the length of time the loan is to run, or, in other words, the period of time over which each loan extends.

In the accompanying drawings Fig. 1 shows a drawer containing a file of massed cards of uniform size so that their upper edges present substantially an even surface; and the edges of these cards are respectively provided with markings so located with respect to a predetermined system of tabulation as to tabulate the data borne by the cards respectively, and indicate the nature of such data as mentioned;

Fig. 2 is a view of what I term the key card by which the markings placed on the edges of the cards are translated into definite information; in other words by which appropriate headings are provided for the tabulated data borne by the cards;

In Fig. 3 is illustrated the application of my invention for indexing the data borne by the leaves of a book;

And in Figs. 4, 5 and 6, I have diagrammatically illustrated variations which may be made in the process of manufacturing or printing the file-elements of my indexed file.

Going back to Figs. 1 and 2; the key-card $a$ is adapted for insertion in the back part of the drawer, behind the cards as shown in Fig. 1. This key-card is provided with a series of heavy and light vertical lines as $b$, $c$, thereby presenting a series of vertical columns, and the latter are provided with headings as at $d$ with respect to which the edge markings of the cards are grouped and tabulated, so that with the aid of the key card the edge markings furnish a synopsis of the data borne by the cards. Thus the columns having the heading $d$ entitled "Amount", give the amount of money loaned; the columns having the heading $e$ entitled "Rate" give the rate of interest; the columns having the heading $f$ entitled "Months" give the months in which the interest is payable; and the columns having the heading $g$ entitled "Years" give the years during which the loan runs.

The column under the title years is subdivided by heavy lines as $h$ into sub-spaces in which the figures expressing the numbers of the years are inserted as sub-titles or headings; and each of these subheads or titles is further divided into four columns by lighter lines $i$, thereby subdividing each year into four quarters, the sub-columns of which are entitled 1, 2, 3, 4, as shown in Fig. 2. The three columns *j* are provided to designate whether the interest is payable annually, semi-annually or quarterly.

The exposed edges of the file of cards are provided with parallel heavy and light lines *k*, *l*, so located as to connect with the heavy and light lines *b*, *c*, borne by the key-card *a*, so that the columns presented by the key-card will thus be extended across the top edges of all the cards in the file.

Let it be assumed that the vertical columns under the heading *d* "Amount" of the key card bear, from left to right, respectively, the designations $5,000, $10,000, $15,000, $20,000 and $25,000; that the columns under the heading *d* "Rate" bear respectively, from left to right, the designations 6, 7 and 8, meaning the rate of interest; that in the three columns *j* are written, respectively, from left to right the designations "Annually", "Semi-annually", "Quarterly".

On the edges of the cards in alinement with the columns of the key-card, are placed the markings which in connection with the headings or designations of the key-card constitute the signs of such designations.

Thus the card *m* is marked to indicate that the loan thereon abstracted is for $10,000, bearing 7% interest annually which is payable in May, and the loan was for 5 years, namely over the years 1918 to 1922, the principal being repayable in May of 1922.

The card *n* in the same manner indicates a loan of $20,000 at 6% interest payable semi-annuallly, in February, and August, with the principal repayable in 1921. In like manner the cards *o* and *p* give the data of loans of $15,000 and $25,000.

For further convenience the cards may be separated by cards *q* in multiples of five, so as to facilitate the computation of the total amount of money represented by any particular class of loans, or all the loans taken together.

The edge markings of the cards merely serve to tabulate the data with respect to said key card; and hence the edge markings are meaningless without the key. But in this there is particular advantage since the information given by the markings is not revealed to anyone not permitted to apply the chart and therefore no information is conveyed by the file of cards, although exposed to full view, until the key card has been inserted.

However, where a uniform system of marking is constantly employed no doubt the system of markings will become impressed upon the mind of the user of my invention after a time to such extent that even without inserting the key *a*, he will be able to read the information conveyed by the markings without having to resort to the key-card as a translating medium.

The foregoing description of my invention illustrates but one use thereof, and the term "cards" is to be understood as including flat folders, pockets and the like articles, or other file elements, adapted for being so stacked that their edges present substantially a continuous surface.

My invention may also be used very advantageously for indexing a series or mass of leaves arranged in book form. For this purpose my invention has also special utility and advantage, because the smallness of the spaces required for accommodating the edge markings of the leaves permits a much greater number of such markings to be used than is permitted by the usual thumb-tab markings of the pages of books. In consequence the data contained in the book may be more extensively indexed for ready reference.

An illustration of the use of my invention for indexing the data carried by the leaves of a book is given in Fig. 3.

The book represents a salesman's reference book. The utility and advantage of my invention for rendering the subject matter of the book readily acessible, and for giving a synopsis of such information is so apparent as not to require further explanation than above given with respect to the use of my invention for indexing and tabulating a card file.

My invention in short, provides a means for rendering the important facts of a business instantly available; in this way providing a dependable solution of the problem of keeping track of the details of the business.

For example, by the use of my invention the accountant can see exactly how many accounts are due at a certain time, the amounts in round numbers; also the balances still to be paid. Buyers can keep track of the exact state of their stock, when purchases were made, and from what factories procured. Employment managers can keep a tangible record showing the exact length of employment of their employees, what their particular kind of employment is, when they should receive another raise in salary, etc. These are but a few uses of my invention. The great result achieved by my invention is the time-saving feature; in other words the convenience of being able to get at the important facts of one's business without having to finger over the cards or other elements of the file; for, as apparent from the foregoing description, the data of the important facts is by my invention rendered available at a glance.

My invention is also adapted for the efficient and extensive indexing of a system of cataloguing.

Instead of imprinting said key with the designations it may be provided only with ruled columns connecting with the related columns ruled across the file elements and spaces at the head of such columns in which to insert the designations thereof. In this way my invention is adapted for being used in making up any special index for a card file or book as found desirable or convenient.

When my invention is used for indexing a book, the key may be a foldable page thereof as illustrated in Fig. 3.

In order to produce the indexing, tabulating, ruled columns and marks therein, or, as the case may be, the latter only alined in columns as above described, it is not necessary that the tops of the edges of the file-elements be actually imprinted; but the effect and result involved in the principle of my invention may be obtained in other ways.

For example: each file element could be printed with a heading functioning as the "key," and the lines segregating the columns could be printed to extend upward to the very edge as illustrated in Fig. 4. The imprint of the type would in such case form an inked depression at the edge of the file element as shown at $r$, in Fig. 4; in the same manner the marks $s$ could be imprinted; and the inked depressions so made at the edges of the file-elements would be readily discernible as diagrammatically illustrated in Fig. 5. In other words, when the file-elements are massed as shown in the latter figure, the inked depressions on the edges of the file-elements would provide line-segments sufficient to suggest ruled columns, even though the line-segments did not extend entirely across the top of the file-element.

Another variation of the printed process of the file-elements attaining the effect and result of my invention is shown in Fig. 6. In this instance the line-segments, and the marks, are printed on the faces of the file-elements at the edges to be exposed as shown at $u$, in Fig. 6, and the file-elements are slightly stepped in a rising inclined plane, thus exposing a fractional part of the top of each file-element, and the imprints borne by such exposed portions producing the effects and results of my invention.

Where the "key" is printed on the face of one file-element as in the instances shown by Figs. 4 to 6, the ruled lines $t$ of the columns would have to extend upward from the headings spaces to the top edge of the file-element, as also illustrated at $v$ in the latter figures, in order that the ruled lines of the key may connect with the ruled lines of the other file-elements, and that the key may function properly as the interpreting medium of the marks borne by the other file-elements.

I claim:

1. A file consisting of flat units massed side by side, a plurality of marks on the exposed edge of each of said file-units, and located so as to lie in columns extending crosswise of the file, the columns denoting segregated, specific items of correlated data of a subject matter, whereby the marks indicate symbolically the contents of the file as a whole, and the marks on each unit give symbolically the details of the contents of such file unit.

2. A file consisting of flat units massed side by side, a plurality of marks on the exposed edge of each of said file units, and located so as to lie in columns extending crosswise of the file, the columns denoting segregated, specific items of correlated data of a subject matter, a key having inscriptions indicating what said columns denote, whereby the marks indicate symbolically the contents of the file as a whole, and the marks on each unit give symbolically the details of the contents of such file unit.

3. A file consisting of flat units massed side by side, parallel lines extending crosswise over the exposed face of the file and dividing such face into columns denoting segregated, specific items of correlated data of a subject matter, marks placed on the exposed edges of each file unit within said columns relatively to the matter denoted by the latter, whereby the marks indicate symbolically the contents of the file as a whole, and the marks on each unit give symbolically the details of the contents of such file unit.

4. A file consisting of flat units massed side by side, parallel lines extending crosswise over the exposed face of the file and dividing such face into columns denoting segregated, specific items of correlated data of a subject matter, marks placed on the exposed edges of each file unit within said columns relatively to the matter denoted by the latter, a key having inscriptions indicating what said columns denote, whereby the marks indicate symbolically the contents of the file as a whole, and the marks on each unit give symbolically the details of the contents of such file unit.

ERNEST C. HEALD.